(12) United States Patent
Farhat (10) Patent No.: US 9,103,711 B2
(45) Date of Patent: Aug. 11, 2015

(54) BEAM SCALE FOR PROPORTIONING A FIRST COMPONENT AND A SECOND COMPONENT

(76) Inventor: Dennis Farhat, Rochester Hills, MI (US)

( * ) Notice: Subject to any disclaimer, the term of this patent is extended or adjusted under 35 U.S.C. 154(b) by 335 days.

(21) Appl. No.: 13/446,841

(22) Filed: Apr. 13, 2012

(65) Prior Publication Data

US 2012/0261198 A1    Oct. 18, 2012

Related U.S. Application Data

(60) Provisional application No. 61/475,263, filed on Apr. 14, 2011.

(51) Int. Cl.
*G01G 19/22* (2006.01)
*G01G 19/56* (2006.01)
*G01G 1/18* (2006.01)

(52) U.S. Cl.
CPC ............... *G01G 19/56* (2013.01); *G01G 1/18* (2013.01); *G01G 19/22* (2013.01)

(58) Field of Classification Search
CPC .......... G01G 1/18; G01G 1/24; G01G 1/243; G01G 19/22; G01G 19/40; G01G 19/56
USPC ............. 177/1, 126, 171, 172, 199, 200, 246, 177/251
See application file for complete search history.

(56) References Cited

U.S. PATENT DOCUMENTS

| | | | |
|---|---|---|---|
| 178,673 A * | 6/1876 | Rhea | 177/126 |
| 819,930 A * | 5/1906 | Sawyer | 177/54 |
| 955,314 A | 4/1910 | Borne | |
| 1,000,201 A * | 8/1911 | Seton | 177/126 |
| 1,793,276 A * | 2/1931 | Chott | 177/162 |
| 2,011,649 A * | 8/1935 | Phillips | 177/44 |
| 2,145,515 A * | 1/1939 | Kucher | 177/200 |
| 2,636,724 A * | 4/1953 | Eacrett | 177/200 |
| 3,656,568 A | 4/1972 | Hejzlar et al. | |
| 3,759,337 A | 9/1973 | Luedke et al. | |
| 4,792,002 A * | 12/1988 | Ward | 177/200 |
| 5,421,713 A | 6/1995 | Backus et al. | |
| 6,536,687 B1 | 3/2003 | Navis et al. | |
| 6,599,482 B1 | 7/2003 | Dorin | |
| 8,399,782 B2 * | 3/2013 | Farhat | 177/246 |
| 2007/0135772 A1 | 6/2007 | Grogan, Jr. | |
| 2007/0289783 A1 | 12/2007 | Tump | |
| 2011/0067932 A1 | 3/2011 | Farhat | |

* cited by examiner

*Primary Examiner* — Peter Macchiarolo
*Assistant Examiner* — Natalie Huls
(74) *Attorney, Agent, or Firm* — Dickinson Wright PLLC (57) ABSTRACT

A beam scale assembly for proportioning a first component in a first container and a second component in a second container including a balance beam extending between a first balancing area and a second balancing area for receiving the first and second containers respectively. A pivot extends downwardly between the first and second balancing areas along a tipping axis. The balancing areas each have a center and define a distance axis across the center in spaced and parallel relationship to the tipping axis. A connection interconnects the balancing area and the balance beam along an adjustment axis and facilitates rotation of the balancing area relative to the balance beam about the adjustment axis for adjusting the distance between the distance axis of the balancing area and the tipping axis.

24 Claims, 9 Drawing Sheets

BEAM SCALE FOR PROPORTIONING A FIRST COMPONENT AND A SECOND COMPONENT

CROSS REFERENCE TO RELATED APPLICATION

This application claims the benefit of application Ser. No. 61/475,263 filed on Apr. 14, 2011.

BACKGROUND OF THE INVENTION

1. Field of the Invention

A beam scale assembly for proportioning a first component in a first container and a second component in a second container.

2. Description of the Prior Art

The beam scale assemblies to which the subject invention pertains are typically used for proportioning a first component and a second component for use according to a baking recipe, formula, and the like. One such assembly is disclosed in U.S. Pat. No. 4,792,002 to Ward including a balance beam that defines a longitudinal axis that extends between a first balancing area and a second balancing area for receiving first and second containers respectively. A pivot extends downwardly from the balance beam between the first and second balancing areas for pivoting the beam along a tipping axis that extends perpendicular to the longitudinal axis. The balancing areas each have a center and a distance axis defined across the center in spaced and parallel relationship to the tipping axis. The first balancing area is slideable along the balance beam for adjusting the distance between the distance axis of the first balancing area and the tipping axis to change the resulting proportioning ratio between the first component and the second component.

Further, the inventor named herein has invented such a beam scale assembly as disclosed in U.S. Patent Application Pub. No. US 2011/0067932 wherein the pivot is movably connected to the balance beam to move the distances axes relative to the tipping axis to define a first variable pivot distance and a second variable pivot distance between each distance axis and the tipping axis respectively to change the resulting proportioning ratio between the first component and the second component.

SUMMARY OF THE INVENTION

The invention provides for such a beam scale assembly including a connection interconnecting at least one of the balancing areas and the balance beam on an adjustment axis offset from the center of the balancing area for rotating the balancing area relative to the balance beam for adjusting the distance between the distance axis of the balancing area and the tipping axis to define a variable distance between the distance axis and the tipping axis to change the resulting proportioning ratio between the first component and the second component.

The invention also provides for a method for proportioning a first component in a first container and a second component in a second container including moving the first container in an orbit relative to the balance beam about an axis offset from the center of the first container to adjust the distance between the distance axis of the first balancing area and the tipping axis to change the resulting proportioning ratio between the first component and the second component.

ADVANTAGES OF THE INVENTION

Thus several advantages of one or more aspects of the invention are that it provides for increased ease of operation for adjusting the resulting proportioning ratio between the first component in the first container to the second component in the second container without the need to alter the overall length of the balance beam. The user merely rotates the balancing area relative to the balance beam to adjust the distance between the distance axis of the balancing area and the tipping axis to change the resulting proportioning ratio.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Referring to the Figures, wherein like numerals indicate corresponding parts throughout the several views, a beam scale assembly is generally shown at 20 for proportioning a first component in a first container 26 presenting a first container proportioning scale 28 and a second component in a second container 22 presenting a second container proportioning scale 24 and for placement on a flat surface 30.

Figure 1:
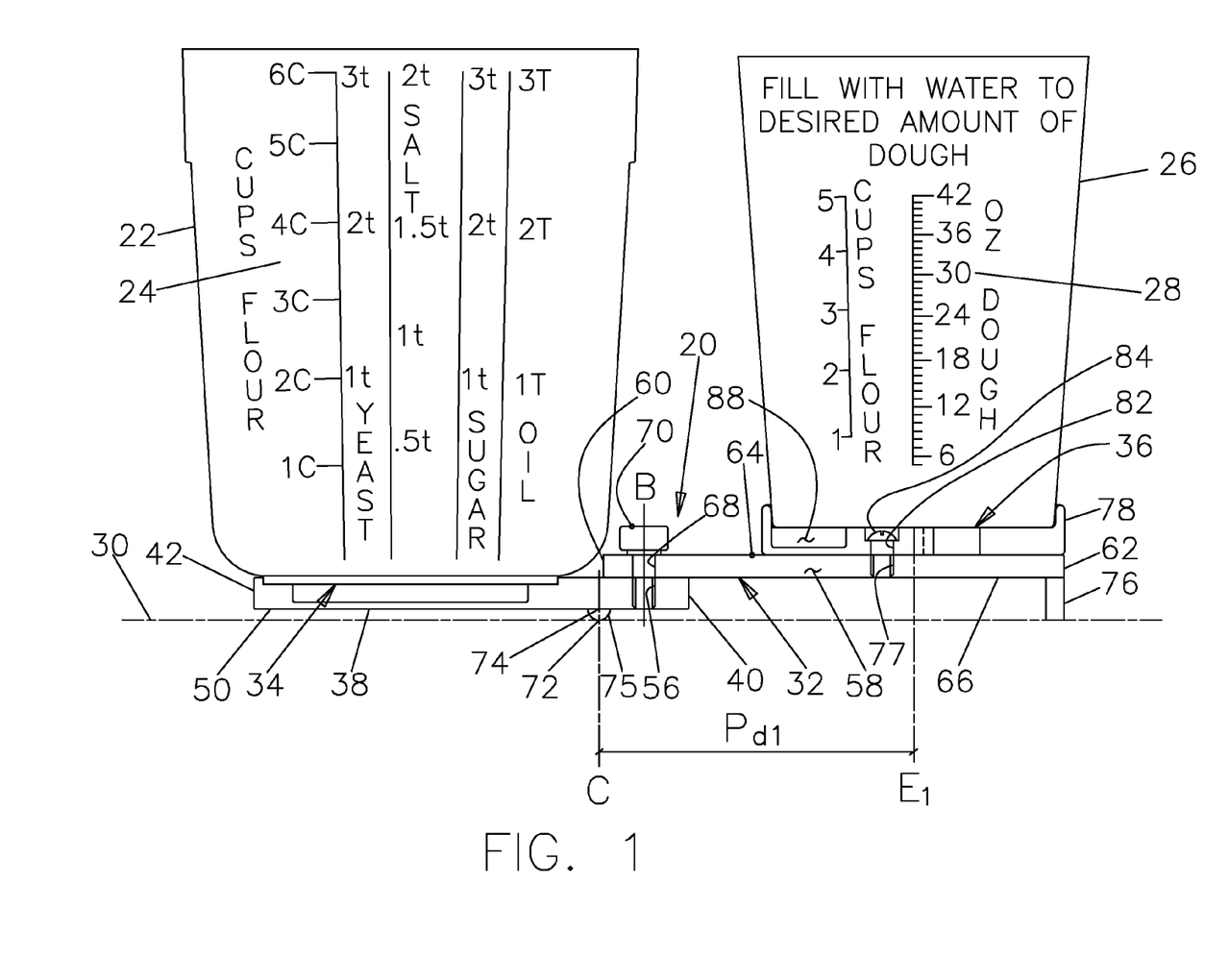
FIG. 1 is a side view of the first enabling embodiment with the first and second containers disposed on the first and second balancing areas respectively.
Figure 2:
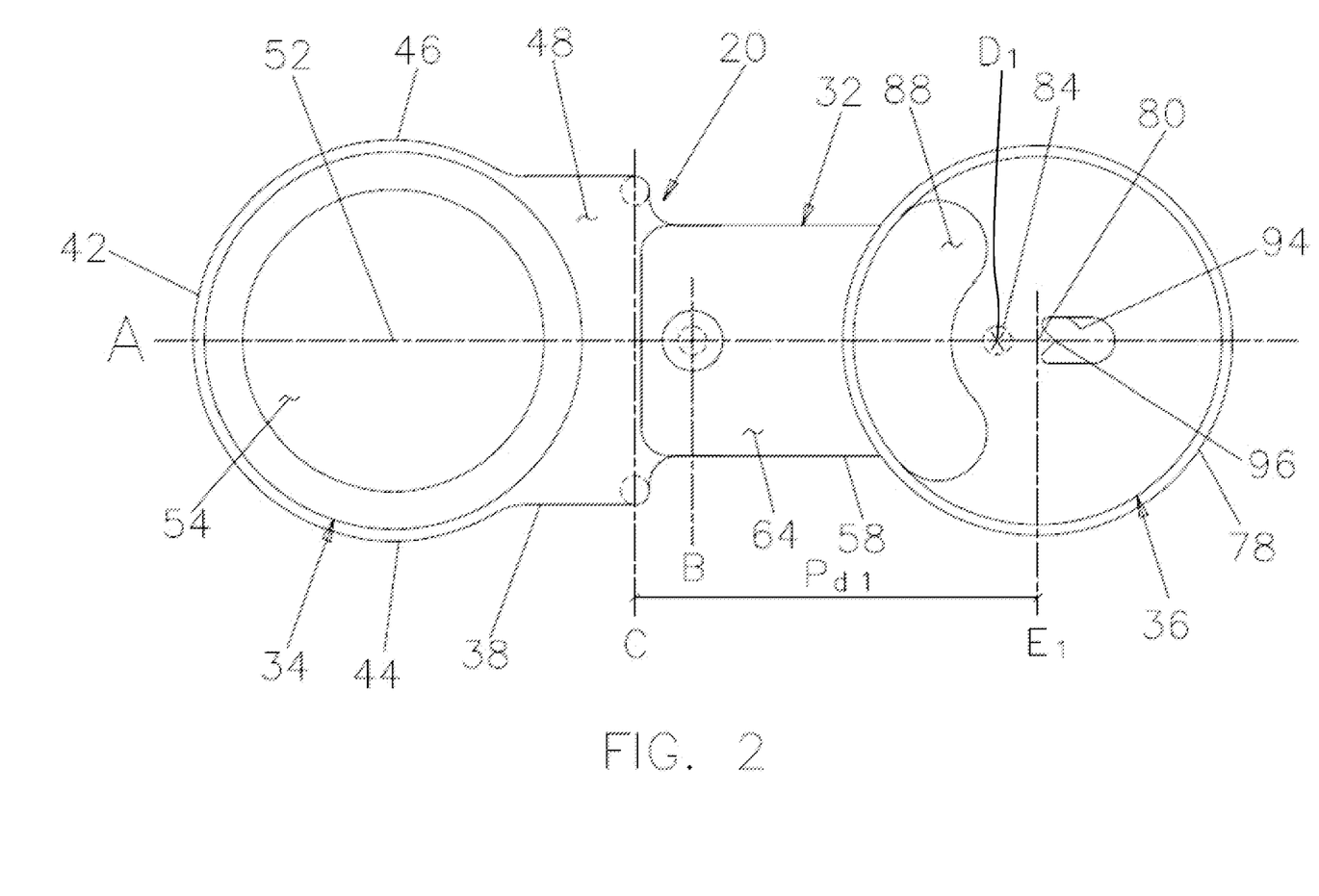
FIG. 2 is a top view of the first enabling embodiment.
Figure 3:
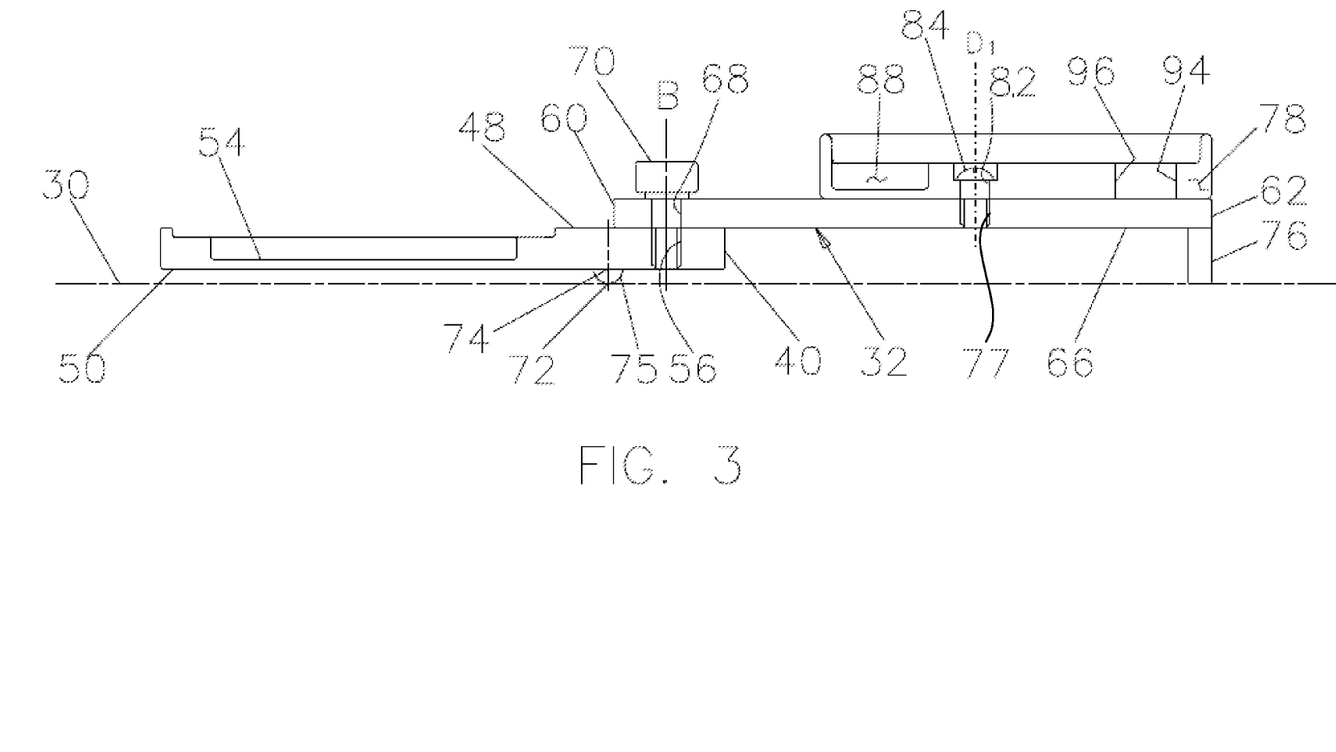
FIG. 3 is a side view of the first enabling embodiment without the containers disposed on the balance beam.
Figure 4:
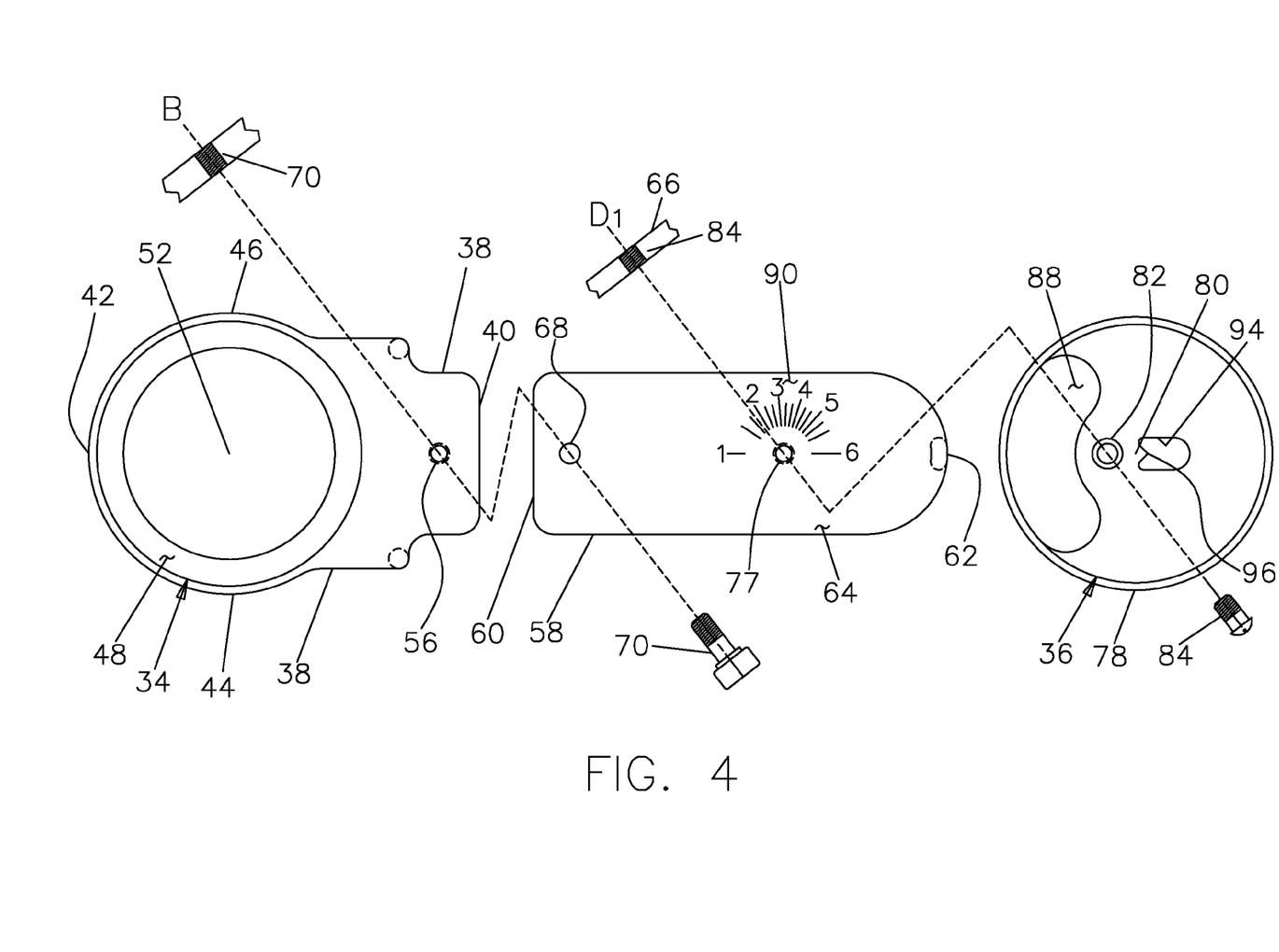
FIG. 4 is an exploded view of the first member, support member and first platform of the first enabling embodiment.

The beam scale assembly 20 includes a balance beam 32 defining a longitudinal axis A extending between a first balancing area 36 and a second balancing area 34 for receiving the first and second containers 26, 22 respectively. The balance beam 32 includes a first member 38 that has a generally rectangular shape and extends from a first member first end 40 to a first member second end 42 that has an arcuate shape. It should be appreciated that the first member 38 could have other shapes (e.g. an oval shape). The first member 38 further has a first member front side 44, a first member rear side 46, a first member upper surface 48 and a first member lower surface 50. The first member 38 defines the second balancing area 34 adjacent the first member second end 42. The second balancing area 34 has a generally round shape and includes a second balancing area center 52 and a round recessed portion 54 that can be used to hold weights to facilitate balancing the scale. It should be appreciated that the second balancing area 34 and recessed portion 54 could have other shapes, but the second balancing area 34 should generally have a shape that corresponds with the second container 22. As best shown in FIG. 4, the first member 38 further defines a first member collapsing aperture 56 adjacent the first member first end 40.

The balance beam 32 further includes a generally rectangular shaped support member 58 that extends from a support member first end 60 to a support member second end 62 and defines a support member upper surface 64 and a support member lower surface 66. The support member second end 62 has an arcuate shape. It should be appreciated that the support member 58 could have other shapes (e.g. an oval shape). The support member 58 defines a support member collapsing aperture 68 adjacent the support member first end 60.

Figure 5:
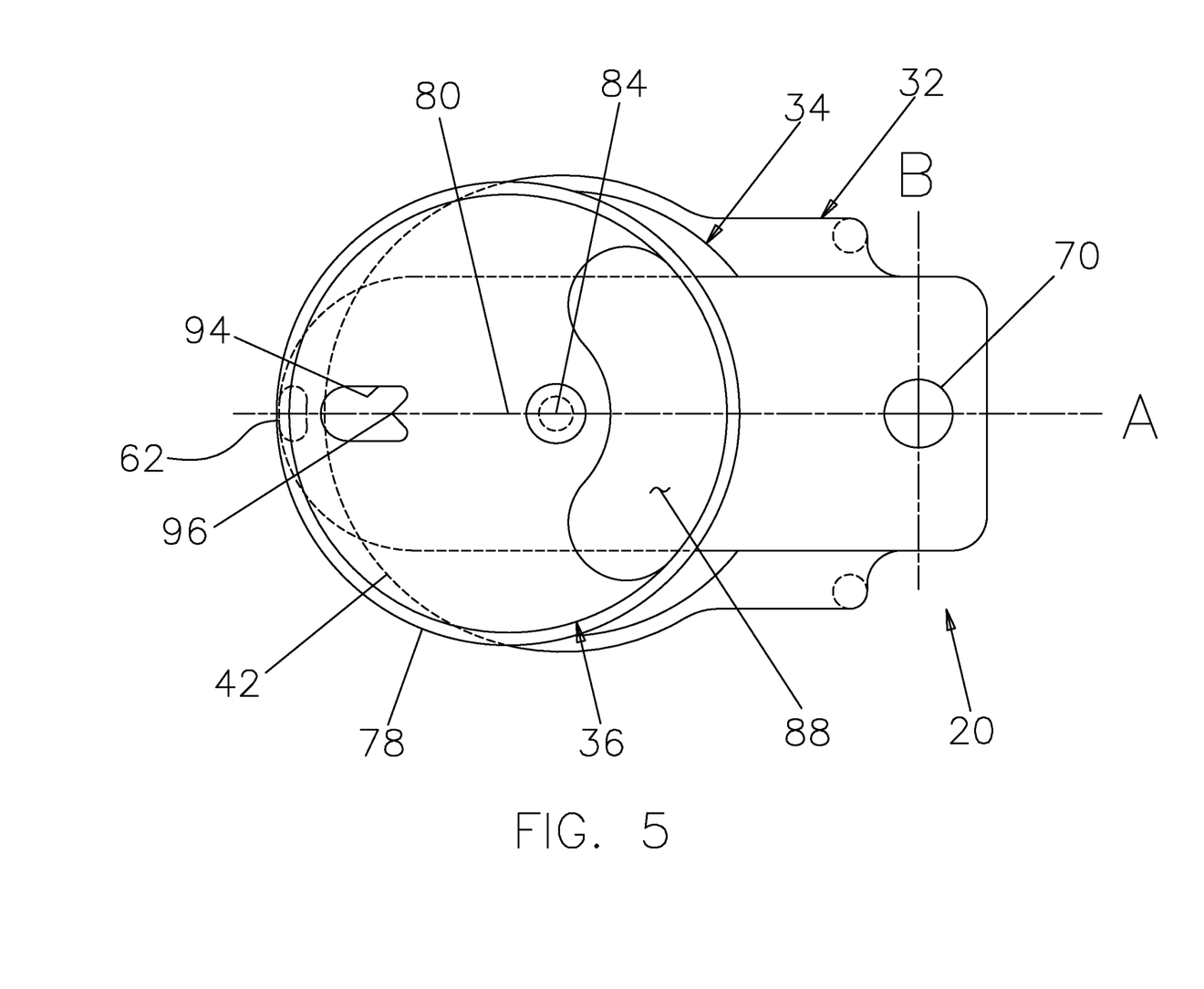
FIG. 5 is a top view of the first enabling embodiment in the stored position.
Figure 6:
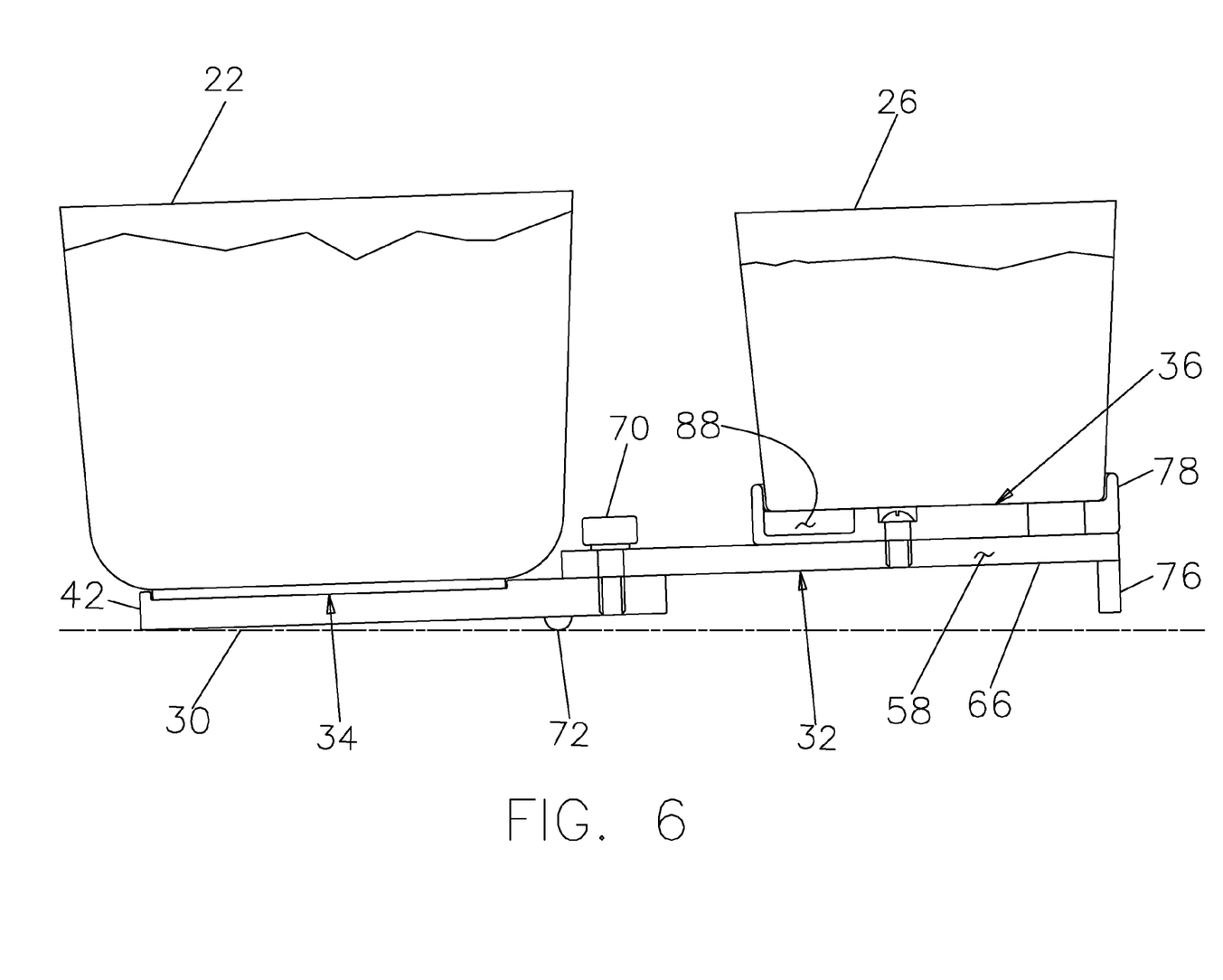
FIG. 6 is a side view of the first enabling embodiment in the filled position.
Figure 7:
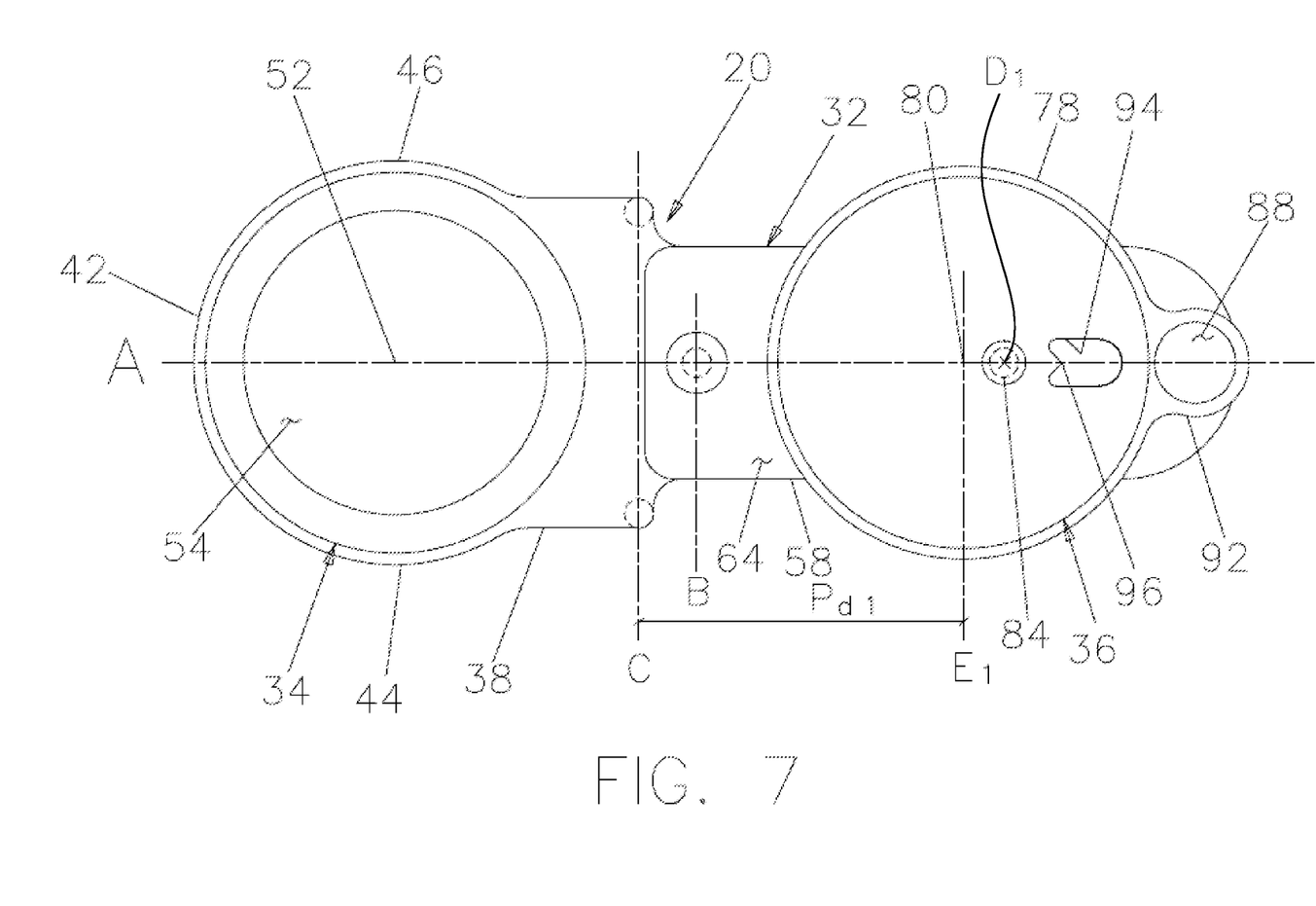
FIG. 7 is a top view of the second enabling embodiment.
Figure 8:
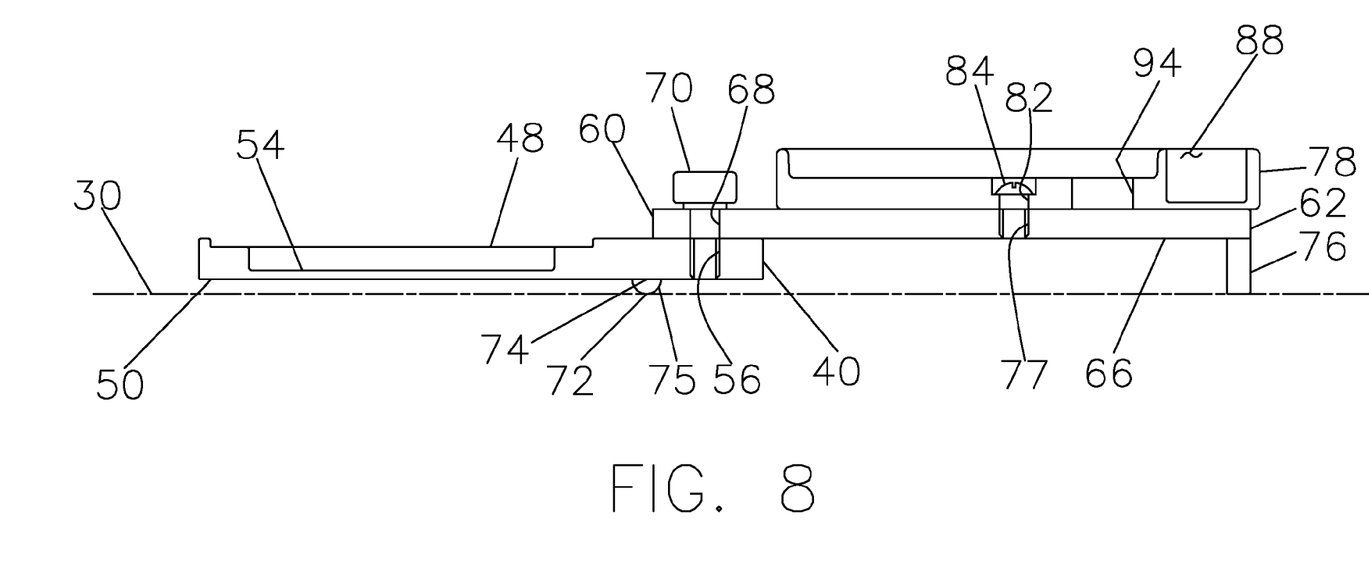
FIG. 8 is a side view of the second enabling embodiment.
Figure 9:
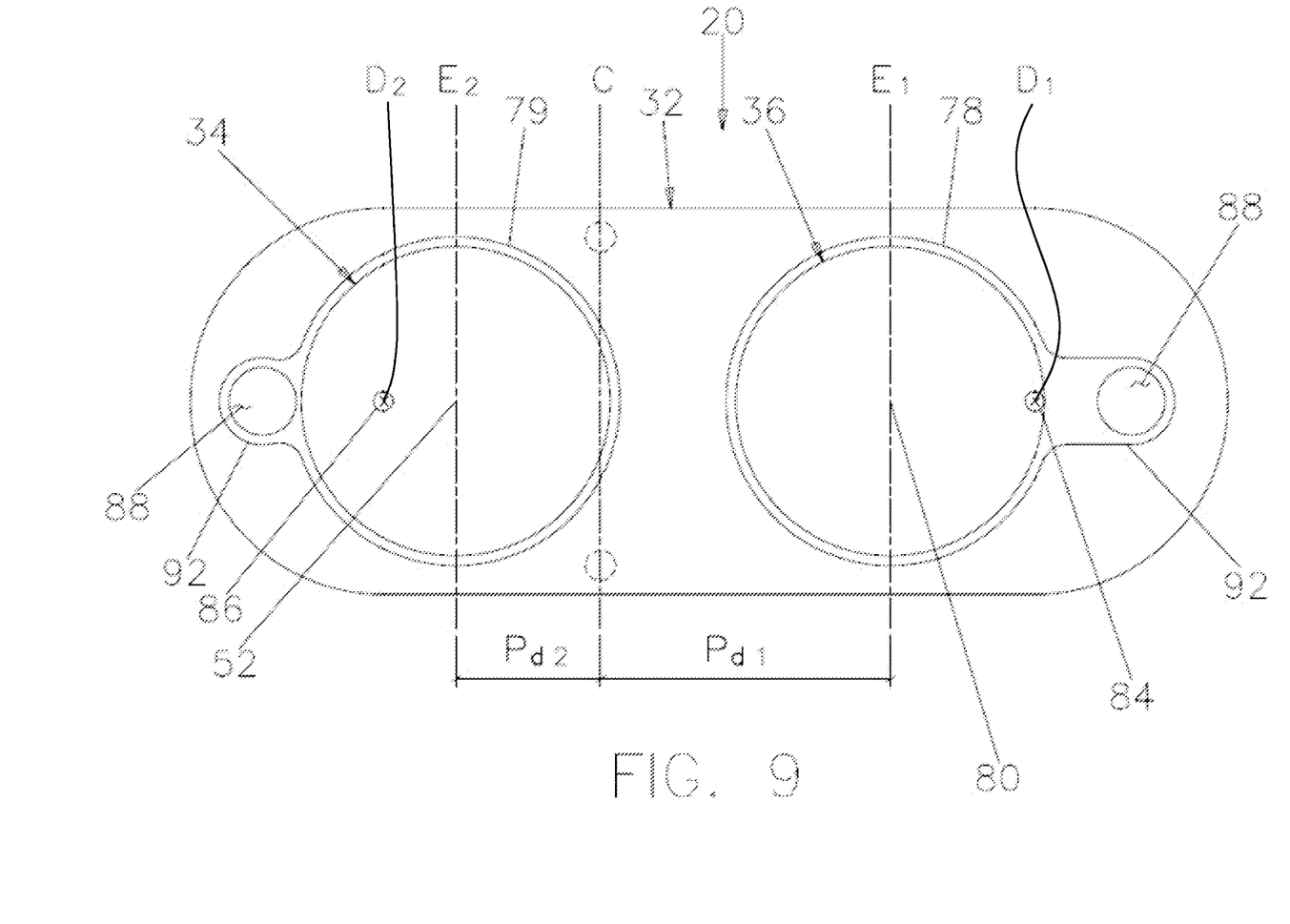
FIG. 9 is a top view of the third enabling embodiment.

The support member first end 60 overlies the first member first end 40 with the collapsing apertures 56, 68 being aligned with one another along a collapsing axis B. A collapsing fastener 70 extends though the collapsing apertures 56, 68 for interconnecting the first member 38 and the support member 58 and for facilitating rotation of the first member 38 relative to the support member 58 about the collapsing axis B between a stored position as best presented in FIG. 5 wherein the first member second end 42 underlies the support member second end 62 and an operative position best presented in FIGS. 1-3, and 6-8 wherein the first member second end 42 extends in the opposite direction to the support member second end 62 along the longitudinal axis A. It should be appreciated that the assembly 20 is more compact when in the stored position such that it can be stored in smaller spaces and packaged in smaller containers, and the assembly 20 is used to proportion the components in the containers 22, 26 while it is in the operative position. In the first enabling embodiment, the collapsing fastener 70 is a nut and bolt, but it should be appreciated that other means for interconnecting the first member 38 and support member 58 could be used (e.g. screw or dowel). Furthermore, it should be appreciated that the first member 38 and support member 58 could be joined together as one piece unit that is not rotatable between the stored and operative positions as best shown in FIG. 9.

The first member lower surface 50 defines at least one pivot 72 that extends downwardly from the first member lower surface 50 adjacent the first member first end 40 between the first and second balancing areas 36, 34 on a tipping axis C extending between the first member front side 44 and the first member rear side 46. In the enabling embodiments, the pivot 72 is a pair of pivots 72 axially spaced from one another along the tipping axis C. Each pivot 72 defines a pivot flat surface 74 for supporting the balance beam 32 and a circular support surface 75 to establish rocking movement of the balance beam 32 for pivoting the balance beam 32 between an add ingredients position as best presented in FIG. 1 wherein the empty first and second empty containers 26, 22 are balanced about the pivot 72, and a filled position as best presented in FIG. 6 wherein the first member second end 42 engages the flat surface 30 in response to adding a predetermined amount of the second component to the second container 22 after the first component has been added to the first container 26 at the point in which the balance beam 32 is substantially balanced about the pivot 72. It should be appreciated that the pivot 72 could be disposed anywhere between the first and second balancing areas 36, 34, so long as the other components of the assembly 20 are sized proportionally to achieve balance when the assembly 20 is balanced in the add ingredients position. Further, it should be appreciated that one or more pivots 72 could be used and the pivots 72 could have other shapes that provide for rocking movement (e.g. an edge).

The support member lower surface 66 defines at least one support leg 76 that extends downwardly from the support member lower surface 66 at a location adjacent the second end of the support member 58 for engaging the flat surface 30 when the balance beam 32 is in the add ingredients position. The support leg 76 prevents the balance beam 32 from pivoting toward the first balancing area 36 after the first component has been added to the first container 26 despite the fact that the balance beam 32 is no longer at equilibrium about the pivot 72. It should be appreciated that more than one support leg 76 could be used and that the assembly 20 could be operated without a support leg 76. The support member 58 further defines a support member adjustment aperture 77 adjacent the support member second end 62.

The balance beam 32 further includes a first platform 78 that overlies the support member 58 at a location adjacent the support member second end 62. The first platform 78 has a generally round shape and defines the first balancing area 36. It should be appreciated that the first platform 78 could have other shapes (e.g. square or oval), but should generally have a shape that corresponds with the shape of the first container 26. The first balancing area 36 has a first balancing area center 80. The first platform 78 further defines a first platform adjustment aperture 82 along a first adjustment axis $D_1$ offset from the center of the first balancing area 36 and aligned with the longitudinal axis A. The adjustment apertures 77, 82 of the first platform 78 and the support member 58 are aligned along the first adjustment axis $D_1$.

The first balancing area 36 has a first distance axis $E_1$ disposed across the center of the first balancing area 36 in spaced and parallel relationship to the tipping axis C. A first connection 84 that includes a fastener extends though the adjustment apertures 77, 82 of the first platform 78 and support member 58 along the first adjustment axis $D_1$. The first connection 84 interconnects the support member 58 and the first platform 78 and facilitates rotation of the first platform 78 relative to the support member 58 about the first adjustment axis $D_1$ for adjusting the distance between the first distance axis $E_1$ of the first balancing area 36 and the tipping axis C to define a first variable distance $Pd_1$ between the first distance axis $E_1$ and the tipping axis C. It should be appreciated that as the first variable distance $Pd_1$ is changed, the location of the first platform 78 and first container 26 is moved relative to the pivot 72. The fastener of the first connection 84 comprises a bolt and nut, but other connections could be used (e.g. dowel or screw).

A counterweight 88 is radially aligned with and spaced radially outwardly away from the center of the first platform 78 and the first adjustment axis $D_1$ for balancing the first platform 78 and the empty first container 26 about the first adjustment axis $D_1$ for maintaining balance between the empty first and second containers 26, 22 about the pivot 72 as the first platform 78 is rotated about the first adjustment axis $D_1$ when the balance beam 32 is in the add ingredients position. In other words, while the assembly 20 is in the add ingredients position, the empty first container 26 and the center of mass of the first platform 78 (including the counterweight 88) are in balance about the first adjustment axis $D_1$ regardless of what orientation the first platform 78 is at. This allows the first variable distance $Pd_1$ to be changed while maintaining the overall balance of the scale while the assembly 20 is in the add ingredients position. Therefore, the final proportioning ratio between the first and second components (corresponding with the first variable distance $Pd_1$) that will be present once the balance beam 32 is in the filled position can be selected while the assembly 20 is in the add ingredients position while maintaining balance of the scale because counterweight 88 advantageously compensates for the shifting of the weight of the first container 26 and first platform 78, eliminating the need for a separate, manually adjusted counterweight commonly found on variable proportioning scales of the prior art (i.e. the scale is always "zeroed" prior to adding the components to the containers 22, 26). It should be appreciated that the presence of additional weight by adding the first component to the first container 26 makes the first platform 78, first container 26, and weight out of equilibrium about the first adjustment axis $D_1$ because the counterweight 88 does not account for the additional weight. Therefore, the overall balance of the balance beam 32 is affected by the adjustment of the first variable distance $Pd_1$ once the first component has been added to the first container 26.

In the first enabling embodiment as best presented in FIGS. 1-6, the counterweight 88 is integral to the first platform 78. However, it should be appreciated that the counterweight 88 could be disposed at other locations on the assembly 20. For example, in the second and third enabling embodiments as best presented in FIGS. 7-9, the first platform 78 includes a flange 92 that extends radially from the first platform 78 and is aligned with the center of said first platform 78 and the first adjustment axis $D_1$, wherein the counterweight 88 is disposed on the flange 92. Furthermore, it should be appreciated that the counterweight 88 could be integral to the first container 26. Additionally, it should be appreciated that the counterweight 88 could be swapped with other counterweights 88 having different weights to compensate for containers 24, 26 having various weights.

As best presented in FIG. 4, the support member upper surface 64 presents an adjustment proportioning scale 90 with increments disposed in an arc about the support member adjustment aperture 77. It should be appreciated that two proportioning scales 90 could be disposed on the support member 58, each on opposing sides of the support member adjustment aperture 77. The adjustment proportioning scale 90 presents a proportion of weights between the first and second containers 26, 22 corresponding to the first variable distance $Pd_1$ when the balance beam 32 is in the filled position. It should be appreciated that based on the first variable distance $Pd_1$, more or less of the second component has to be added to the second container 22 to bring the scale substantially back to equilibrium (or just past equilibrium in the filled position) to account for the addition of the first component in the first container 26. It should be appreciated that if no support leg were present, the filled position could be the point at which the balance beam 32 were balanced about the pivot 72 after the first and second components were added to the containers 24, 26. The first platform 78 presents a scale viewing opening 94 radially spaced from the center of the first balancing area 36 for viewing the increments of the adjustment proportioning scale 90 as the first balancing area 36 platform is rotated about the first adjustment axis $D_1$ when the balance beam 32 is in the add ingredients position. It should be appreciated that the first container 26 could be made of a transparent material for allowing the adjustment proportioning scale 90 to be viewed while the first container 26 is disposed on the first balancing area 34. The first platform 78 further defines a proportioning pointer 96 for alignment with the increments of the adjustment proportioning scale 90 to select a desired proportion as the first platform 78 is rotated about the first adjustment axis $D_1$ when the balance beam 32 is in the add ingredients position to select a proportion between the first component and the second component when the balance beam 32 is in the filled position. It should be appreciated that the adjustment proportioning scale 90 could be positioned such that it does not underlie the first platform 78, and accordingly no scale viewing opening 94 would be necessary and the proportioning pointer 96 could be disposed on the perimeter of the first platform 78. It should also be appreciated that the proportioning pointer 96 could be a marking or label on the first platform 78.

A method for proportioning a first component in a first container 26 presenting a first container proportioning scale 28 and a second component in a second container 24 presenting a second container proportioning scale 24 on a beam scale assembly 20 is also included.

The method starts with the step of rotating the first platform 78 relative to the support member 58 about the first adjustment axis $D_1$ to align the proportioning pointer 96 of the first platform 78 with a predetermined increment on the adjustment proportioning scale 90 to adjust the distance between the first distance axis $E_1$ of the first balancing area 36 and the tipping axis C to define the first variable distance $Pd_1$ between the first distance axis $E_1$ and the tipping axis C. In other words, the user rotates the first platform 78 about the first adjustment axis $D_1$ until the proportioning pointer 96 is aligned with the predetermined increment of the adjustment proportioning scale 90 corresponding with the final proportion of the first component to the second component that the user desires. For example, in the application of making pizza dough, the user might desire a 60% ratio of water (the first component) to flour (the second component). In this case, the user would rotate the first platform 78 until the proportioning pointer 96 is aligned with the 60% indicia on the adjustment proportioning scale 90, and accordingly the first variable distance $Pd_1$ will ultimately lead to 60% of the first component (water) to be present in the first container 26 relative to the second component (flour) in the second container 22 to bring the balance beam 32 substantially back to equilibrium (or just past equilibrium).

The method proceeds with the step of disposing the first and second containers 26, 22 on the first and second balancing areas 34, 36 respectively. It should be appreciated that at this point, the assembly 20 is in the add ingredients position, and therefore the scale is at equilibrium about the tipping axis C, regardless of what proportion is selected. It should be appreciated that the first platform 78 could initially be rotated with or without the containers 26, 22 disposed on the first and first balancing areas 34, 36.

The method proceeds with the step of adding a predetermined amount of the first component (e.g. water) to the first container 26 based on the first container proportioning scale 28. Following the example of a user making pizza dough, the first container proportioning scale 28 can display an amount of the first component (water) that should be added to the first container 26 to ultimately make a predetermined number of ounces of pizza dough. Accordingly, if the user desired to make twenty four ounces of dough, they would fill the first container 26 with water to the corresponding indicia on the first container proportioning scale 28 that reads twenty four ounces. It should be appreciated that the balance beam 32 is no longer at equilibrium about the tipping axis C at this point since the first component (water) has been added to the first container 26. However, the balance beam 32 does not tip about the tipping axis C toward the second balance area because the support leg 76 prevents it from doing so. It should be appreciated that the assembly 20 could be operated without a support leg 76, therefore the assembly would tip about the tipping axis C toward the first balancing area 36 once the first component has been added to the first container 26.

The method proceeds with the step of adding the second component (e.g. flour) to the second container 22 until the balance beam 32 pivots about the pivot 72 toward the first member 38 in the filled position. Following the previous example, the user would slowly add flour to the second container 22 until the balance beam 32 pivots toward the first member 38 in the filled position. It should be appreciated that the balance beam 32 tips at the point in which the balance beam 32 is substantially at equilibrium about the pivot 72 (barely outside of equilibrium toward the second balancing area 34). Therefore, the balance beam 32 would tip at the point in which approximately a 60% ratio of the first component (water) to the second component (flour) is present in the containers 22, 26. As previously mentioned, it should be appreciated that if no support leg were present, the filled position could be the point at which the balance beam 32 is brought back to equilibrium about the pivot 72 after adding the second component to the second container 22.

The method proceeds with adding a third component to the second container 22 based on a measurement of the second component (e.g. flour) in the second container 22 according to the second container proportioning scale 24. Following the previous example, if two cups of flour were added to the second container 22 to produce a 60% ratio of water to flour among the containers 26, 22, the second proportioning scale 24 could instruct the owner to add three quarters of a tablespoon of salt, one tablespoon of sugar and one tablespoon of oil to the flour, wherein all of these measurements correspond to cups of flour and a specific type of dough. It should be appreciated that any number of additional types of components could be added based on the second proportioning scale 24.

In a third enabling embodiment as best presented in FIG. 9, the balance beam 32 further includes a second platform 79 defining the second balancing area 34. The second balancing area 34 has a second distance axis $E_2$ disposed across the second balancing area center 52 in spaced and parallel relationship to the tipping axis C. A second connection 86 interconnects the second platform 79 and the balance beam 32 on a second adjustment axis $D_2$ offset from the second balancing area center 52 for rotating the second platform 79 relative to the balance beam 32 about the second adjustment axis $D_2$ for adjusting the distance between the second distance axis $E_2$ of the second balancing area 34 and the tipping axis C to define a second variable distance $Pd_2$. Accordingly, in the third enabling embodiment, both balancing areas 34, 36 are rotatable relative to the balance beam 32, and therefore two variable distance axes $Pd_1$, $Pd_2$ are present for adjusting the proportion of weight between the first component and the second component. It should be appreciated that an additional adjustment proportioning scale associated with the rotation of the second platform 79 could be disposed on the balance beam 32 and the proportioning scales could present the resulting proportion of weight between the first and second components that corresponds with the rotation of the first and second platforms 79, 78 and adjustment of the variable distance axes $Pd_1$, $Pd_2$.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A beam scale assembly (20) for proportioning a first component in a first container (26) and a second component in a second container (22) comprising;
   a balance beam (32) defining a longitudinal axis (A) extending between a first balancing area (36) and a second balancing area (34) for receiving the first and second containers (26, 22) respectively,
   said first balancing area (34) extending along a first plane and said second balancing area (36) extending along a second plane with said first and second planes being parallel to said longitudinal axis (A),
   said balance beam (32) including at least one member (38, 58) extending along said longitudinal axis (A) and at least one platform (78, 79) connected with said member (38, 58) and defining one of said first and second balancing areas (36, 34),
   a pivot (72) extending downwardly from said balance beam (32) between said first and second balancing areas (36, 34) for pivoting said balance beam (32) about a tipping axis (C),
   said tipping axis (C) extending perpendicular to said longitudinal axis (A) and parallel to said first and second planes of said first and second balancing areas (36, 34),
   said first and second balancing areas (36, 34) each having a center (80, 52),
   and characterized by a connection (84, 86) interconnecting said platform (78, 79) and said member (38, 58) on an adjustment axis (D, $D_2$) to rotate said platform (78, 79) about said adjustment axis ($D_1$, $D_2$),
   said adjustment axis ($D_1$, $D_2$) offset from said center (80, 52) of said platform (78, 79) and perpendicular to both said tipping axis (C) and said longitudinal axis (A) for rotating at least one of said balancing area (36, 34) relative to said balance beam (32) with said first and second planes of said first and second balancing areas (34, 36) remaining parallel to said longitudinal axis (A) for adjusting the distance between said center (80, 52) of said at least one of said balancing areas (36, 34) and said tipping axis (C) to adjust the resulting proportioning ratio between the first component in the first container (26) and the second component in the second container (22) when the beam scale assembly (20) is in a filled position.

2. A beam scale assembly (20) as set forth in claim 1 further including a counterweight (88) radially aligned with and spaced radially outwardly away from said center (80, 52) of said at least one of said balancing areas (36, 34) and said adjustment axis ($D_1$, $D_2$) for balancing said at least one of said balancing areas (36, 34) and the empty container (26, 22) about said adjustment axis ($D_1$, $D_2$) for maintaining balance between the empty first and second containers (26, 22) about said pivot (72) as said balancing area (36, 34) is rotated about said adjustment axis ($D_1$, $D_2$).

3. A beam scale assembly (20) as set forth in claim 2 wherein said counterweight (88) is integral to said platform (78, 79).

4. A beam scale assembly (20) as set forth in claim 2 wherein said platform (78, 79) includes a flange (92) extending radially from said platform (78, 79) and aligned with said center (80, 52) and with said adjustment axis ($D_1$, $D_2$) and said counterweight (88) is disposed on said flange (92).

5. A beam scale assembly (20) as set forth in claim 2 further including a container (26, 22) with said counterweight (88) being integral to said container (26, 22).

6. A beam scale assembly as set forth in claim 2 wherein said adjustment axis ($D_1$, $D_2$) includes a first adjustment axis ($D_1$) and said counterweight (88) is radially aligned with and spaced radially outwardly away from said center (80) of said first balancing area (36) for balancing said first balancing area (36) and the empty first container (26) about said first adjustment axis ($D_1$) for maintaining balance between the empty first and second containers (26, 22) about said pivot (72) as said balancing area (36) is rotated about said first adjustment axis ($D_1$) and said balance beam (32) pivots between an add ingredients position wherein the empty first and second containers (26, 22) are balanced about said pivot (72) and a filled position wherein said balance beam (32) tips toward said second balancing area (34) in response to adding a predetermined amount of the second component to the second container (22).

7. A beam scale assembly (20) for proportioning a first component in a first container (26) and a second component in a second container (22) comprising;
- a balance beam (32) defining a longitudinal axis (A) extending between a first balancing area (36) and a second balancing area (34) for receiving the first and second containers (26, 22) respectively,
- said first balancing area (34) extending along a first plane and said second balancing area (36) extending along a second plane with said first and second planes being parallel to said longitudinal axis (A),
- said balance beam (32) including at least one member (38, 58) extending along said longitudinal axis (A) and at least one platform (78, 79) connected with said member (38, 58) and defining one of said first and second balancing areas (36, 34),
- a pivot (72) extending downwardly from said balance beam (32) between said first and second balancing areas (36, 34) for pivoting said balance beam (32) about a tipping axis (C),
- said tipping axis (C) extending perpendicular to said longitudinal axis (A) and parallel to said first and second planes of said first and second balancing areas (36, 34),
- said first and second balancing areas (36, 34) each having a center (80, 52),
- and characterized by a connection (84, 86) interconnecting said platform (78, 79) and said member (38, 58) on an adjustment axis ($D_1, D_2$) to rotate said platform (78, 79) about said adjustment axis ($D_1, D_2$),
- said adjustment axis ($D_1, D_2$) offset from said center (80, 52) of said platform (78, 79) and perpendicular to both said tipping axis (C) and said longitudinal axis (A) for rotating at least one of said balancing area (36, 34) relative to said balance beam (32) with said first and second planes of said first and second balancing areas (34, 36) remaining parallel to said longitudinal axis (A) for adjusting the distance between said center (80, 52) of said at least one of said balancing areas (36, 34) and said tipping axis (C) to adjust the resulting proportioning ratio between the first component in the first container (26) and the second component in the second container (22) when the beam scale assembly (20) is in a filled position,
- an adjustment proportioning scale (90) with increments for presenting a proportion of weight between the first and second components in the first and second containers (26, 22) corresponding to said distance between said center (80, 52) of said at least one of said balancing areas (36, 34) and said tipping axis (C) when said balance beam (32) is in said filled position.

8. A beam scale assembly (20) as set forth in claim 7 wherein said adjustment proportioning scale (90) is disposed in an arc about said adjustment axis ($D_1, D_2$).

9. A beam scale assembly (20) as set forth in claim 8 wherein said at least one of said balancing areas (36, 34) includes a proportioning pointer (96) for alignment with said increments of said adjustment proportioning scale (90) to select a proportion as said platform (78, 79) is rotated about said adjustment axis ($D_1, D_2$) when said balance beam (32) is in an add ingredients position to select a proportion between the first component and the second component when said balance beam (32) is in said filled position.

10. A beam scale assembly (20) as set forth in claim 9 wherein said adjustment proportioning scale (90) underlies said at least one of said balancing areas (36, 34).

11. A beam scale assembly (20) as set forth in claim 10 wherein said at least one of said balancing areas (36) presents a scale viewing opening (94) radially spaced from said adjustment axis ($D_1, D_2$) of said at least one of said balancing areas (36, 34) and overlying said adjustment proportioning scale (90) for viewing said adjustment proportioning scale (90).

12. A beam scale assembly (20) as set forth in claim 7 further including a counterweight (88) radially aligned with and spaced radially outwardly away from said center (80, 52) of said at least one of said balancing areas (36, 34) and said adjustment axis ($D_1, D_2$) for balancing said at least one of said balancing areas (36, 34) and the empty container (26, 22) about said adjustment axis ($D_1, D_2$) for maintaining balance between the empty first and second containers (26, 22) about said pivot (72) as said at least one of said balancing areas (36, 34) is rotated about said adjustment axis ($D_1, D_2$).

13. A beam scale assembly (20) as set forth in claim 12 wherein said counterweight (88) is integral to said platform (78, 79).

14. A beam scale assembly (20) as set forth in claim 12 wherein said platform (78, 79) includes a flange (92) extending radially from said platform (78, 79) and aligned with said center (80, 52) and with said adjustment axis ($D_1, D_2$) and said counterweight (88) is disposed on said flange (92).

15. A beam scale assembly (20) as set forth in claim 12 further including a first container (26) with said counterweight (88) being integral to said first container (26).

16. A beam scale assembly as set forth in claim 12 wherein said adjustment axis ($D_1, D_2$) includes a first adjustment axis ($D_1$) and said counterweight (88) is radially aligned with and spaced radially outwardly away from said center (80) of said first balancing area (36) for balancing said first balancing area (36) and the empty first container (26) about said first adjustment axis ($D_1$) for maintaining balance between the empty first and second containers (26, 22) about said pivot (72) as said balancing area (36) is rotated about said first adjustment axis ($D_1$) and said balance beam (32) pivots between an add ingredients position wherein the empty first and second containers (26, 22) are balanced about said pivot (72) and a filled position wherein said balance beam (32) tips toward said second balancing area (34) in response to adding a predetermined amount of the second component to the second container (22).

17. A beam scale assembly (20) for proportioning a first component in a first container (26) presenting a first container proportioning scale (28) and a second component in a second container (22) presenting a second container proportioning scale (24) and for placement on a flat surface (30) and comprising;
- a balance beam (32) defining a longitudinal axis (A) extending between a first balancing area (36) and a second balancing area (34) for receiving the first and second containers (26, 22) respectively,
- said balance beam (32) including at least one member (38, 58) extending along said longitudinal axis (A) and at least one platform (78, 79) connected with said member (38, 58) and defining one of said first and second balancing areas (36, 34) in a plane being parallel to said longitudinal axis (A), said balance beam (32) defining said at least one pivot (72) extending downwardly from said balance beam (32) between said first and second balancing areas (36, 34) for pivoting said balance beam (32) about a tipping axis (C), said tipping axis (C) extending perpendicular to said longitudinal axis (A) and parallel to said first and second planes of said first and second balancing areas (36, 34), said at least one member (38, 58) including a support member (58) extending from a support member first end (60) to a support member second end (62) having an arcuate shape, said at least one pivot (72) being a pair of pivots (72) axially spaced from one another along said tipping axis (C), said pivot (72) defining a pivot flat surface (74) for supporting said balance beam (32) and a circular support surface (75) to establish rocking movement of said balance beam (32), said balancing areas (36, 34) each having a center (80, 52) and a distance axis ($E_1$, $E_2$) defined across said centers (80, 52), and characterized by a connection (84, 86) interconnecting said at least one platform (78, 79) and said member (38, 58) for rotation about an adjustment axis ($D_1$, $D_2$), said adjustment axis ($D_1$, $D_2$) offset from said center (80, 52) of said at least one platform (78, 79) and perpendicular to both said tipping axis (C) and said longitudinal axis (A) for rotating said balancing area (36, 34) relative to said balance beam (32) for adjusting the distance between said distance axis ($E_1$, $E_2$) of said balancing area (36, 34) and said tipping axis (C) to define a variable distance ($Pd_1$, $Pd_2$) between said distance axis ($E_1$, $E_2$) and said tipping axis (C), said at least one platform (78, 79) including a first platform (78) overlying said support member (58) adjacent said support member second end (62) and having a generally round shape and defining said first balancing area (36) and a first center (80), said adjustment axis ($D_1$, $D_2$) including a first adjustment axis (Dl) offset from said first center (80) of said first platform (78) and aligned with said longitudinal axis (A), said first platform (78) defining a first platform adjustment aperture (82) along said first adjustment axis ($D_1$), a first connection (84) including a fastener extending through said first platform adjustment apertures (82) along said first adjustment axis ($D_1$) for interconnecting said balance beam (32) and said first platform (78), a counterweight (88) radially aligned with and spaced radially outwardly away from said first platform center (80) and said first adjustment axis ($D_1$) for balancing said first platform (78) and said empty first container (26) about said first adjustment axis ($D_1$) for maintaining balance between the empty first and second containers (26, 22) about said pivot (72) as said first platform (78) is rotated about said first adjustment axis ($D_1$).

18. A beam scale assembly (20) as set forth in claim 17 wherein said at least one member (38, 58) further includes a first member (38) having a generally rectangular shape extending from a first member first end (40) to a first member second end (42) having an arcuate shape and having a first member front side (44) and a first member rear side (46) and a first member upper surface (48) and a first member lower surface (50), said first member (38) defines said second balancing area (34) adjacent said first member second end (42) and said second balancing area (34) has a generally round shape and includes a recessed portion (54) having a generally round shape, said first member (38) defines a first member collapsing aperture (56) adjacent said first member first end (40), said support member (58) has a generally rectangular shape extending from said support member first end (60) to said support member second end (62) and defining a support member upper surface (64) and a support member lower surface (66), said support member (58) defines a support member collapsing aperture (68) adjacent said support member first end (60), said support member first end (60) overlies said first member first end (40) with said support member collapsing aperture (68) and said first member collapsing aperture (56) being aligned with one another along a collapsing axis (B), a collapsing fastener (70) extends though said collapsing apertures (56, 68) for interconnecting said first member (38) and said support member (58) and for rotating said first member (38) relative to said support member (58) about said collapsing axis (B) between a stored position wherein said first member second end (42) underlies said support member second end (62) and an operative position wherein said first member second end (42) extends in the opposite direction to said support member second end (62) along said longitudinal axis (A), said collapsing fastener (70) comprises a bolt and nut, said first member lower surface (50) defines said least one pivot (72) extending downwardly from said first member lower surface (50) adjacent said first member first end (40) between said first and second balancing areas (36, 34) on said tipping axis (C) wherein said tipping axis extends between said first member front side (44) and said first member rear side (46), said rocking movement of said balance beam (32) is for pivoting said balance beam (32) between an add ingredients position wherein the empty first and second empty containers (26, 22) are balanced about said pivot (72) and a filled position wherein said first member second end (42) engages the flat surface (30) in response to adding a predetermined amount of the second component to the second container (22), said support member lower surface (66) defines at least one support leg (76) extending downwardly from said support member lower surface (66) and located adjacent said second end of said support member (58) for engaging the flat surface (30) when said balance beam (32) is in said add ingredients position, said support member (58) defines a support member adjustment aperture (77) adjacent said support member second end (62), said first platform (78) overlies said support member (58) adjacent said support member second end (62), said adjustment apertures (77, 82) of said first platform (78) and said support member (58) are aligned along said first adjustment axis ($D_1$), said first connection (84) interconnects said support member (58) and said first platform (78) for rotating said first platform (78) relative to said support member (58) about said first adjustment axis ($D_1$), said support member upper surface (64) presents an adjustment proportioning scale (90) with increments disposed in an arc about said support member adjustment aperture (77) for presenting a proportion of weights between the first and second containers (26, 22) corresponding to said first variable distance ($Pd_1$) when said balance beam (32) is in said filled position, said second balancing platform presents a scale viewing opening (94) radially spaced from said center of said first balancing area (36) for viewing said increments of said adjustment proportioning scale (90) as said first balancing area (36) platform is rotated about said first adjustment axis ($D_1$) when said balance beam (32) is in said add ingredients position, said first platform (78) defines a proportioning pointer (96) for alignment with said increments of said adjustment proportioning scale (90) to select a desired proportion as said first platform (78) is rotated about said first adjustment axis ($D_1$) when said balance beam (32) is in said add ingredients position to select a proportion between the first component and the second component when said balance beam (32) is in said filled position.

19. A beam scale assembly (20) as set forth in claim 18 wherein said counterweight (88) is integral to said first platform (78).

20. A beam scale assembly (20) as set forth in claim 18 wherein said first platform (78) includes a flange (92) extending radially from said first platform (78) and aligned with said center of said first platform (78) with said first adjustment axis ($D_1$) and said counterweight is disposed on said flange (92).

21. A beam scale assembly (20) as set forth in claim 18 further including a first container (26) with said counterweight (88) being integral to said first container (26).

22. A beam scale assembly (20) as set forth in claim 17 wherein said at least one platform (78, 79) further includes a second platform (79) wherein said second balancing area (34) is defined by said second platform (79) and has a second distance axis ($E_2$) disposed across said second balancing area center (52) in spaced and parallel relationship to said tipping axis (C) and said second balancing area (34) further includes a second connection (86) interconnecting said second platform (79) and said balance beam (32) on a second adjustment axis ($D_2$) offset from said center (52) of said second balancing area (34) for rotating said second balancing area (34) relative to said balance beam (32) about said second adjustment axis ($D_2$) for adjusting the distance between said second distance axis ($E_2$) of said second balancing area (34) and said tipping axis (C) to define a second variable distance ($Pd_2$).

23. A method for a proportioning a first component in a first container (26) and a second component in a second container (22) on a balance beam (32) including a first balancing area (36) and a second balancing area (34) each having a center (80, 52) for receiving the first and second containers (26, 22) respectively and a pivot (72) extending downwardly from the balance beam (32) between the first and second balancing areas (36, 34) along a tipping axis (C) for pivoting the beam and the containers (36, 34) having a center and a distance axis ($E_1$, $E_2$) disposed across each center of the containers in spaced and parallel relationship with the tipping axis (C) comprising;

disposing the first and second containers (26, 22) on the first and second balancing areas (34, 36) respectively, and characterized by moving one of the containers (22, 26) in an orbit relative to the balance beam (32) about an axis ($D_1$, $D_2$) offset from the center (80, 52) of one of the balancing areas (36, 34) to adjust the distance between the distance axis ($E_1$, $E_2$) of the container and the tipping axis (C).

24. A method for proportioning a first component in a first container (26) presenting a first container proportioning scale (28) and a second component in a second container (22) presenting a second container proportioning scale (24) on a beam scale assembly (20) for placement on a flat surface (30) and including a balance beam (32) defining a longitudinal axis (A) extending between a first balancing area (36) and a second balancing area (34) for receiving the first and second containers (26, 22) respectively and including a first member (38) extending from a first member first end (40) to a first member second end (42) and having a first member front side (44) and a first member rear side (46) and defining the second balancing area (34) adjacent the first member first end (40) for receiving the second container (22) and the balance beam (32) further including a support member (58) extending from a support member first end (60) to a support member second end (62) and the support member (58) extending away from the first member first end (40) and the balance beam (32) further including at least one pivot (72) extending downwardly from the first member (38) adjacent the first member first end (40) between the first and second balancing areas (36, 34) on a tipping axis (C) extending between the first member front side (44) and rear side (46) for pivoting the balance beam (32) between an add ingredients position wherein the empty first and second containers (26, 22) are balanced about the pivot (72) and a filled position wherein the first member second end (42) engages the flat surface (30) in response to adding a predetermined amount of the second component to the second container (22) and the balance beam (32) further including a first platform (78) overlying the support member (58) adjacent the support member second end (62) and defining the first balancing area (36) and the first balancing area (36) having a center (80) and having a first distance axis ($E_1$) disposed across the center (80) of the first balancing area (36) in spaced and parallel relationship with the tipping axis (C) and being rotatable relative to the support member (58) about a first adjustment axis ($D_1$) offset from the center for adjusting the distance between the first distance axis ($E_1$) of the first balancing area (36) and the tipping axis (C) to define a first variable distance ($Pd_1$) between the first distance axis ($E_1$) and the tipping axis (C) and a counterweight (88) radially aligned with and spaced radially outwardly away from the center of the first platform (78) and the first adjustment axis ($D_1$) for balancing the first platform (78) and the empty first container (26) about the first adjustment axis ($D_1$) for maintaining balance between the empty first and first containers (26, 22) about the pivot (72) as the first platform (78) is rotated about the first adjustment axis ($D_1$) when the balance beam (32) is in the add ingredients position and the support member upper surface (64) presenting an adjustment proportioning scale (90) with increments for presenting a proportion of weights between the first and second components in the first and second containers (26, 22) respectively corresponding to the first variable distance ($Pd_1$) when the balance beam (32) is in the filled position and including a scale viewing opening (94) radially spaced from the center of the first platform (78) for viewing the adjustment proportioning scale (90) as the first balancing area (36) platform is rotated about the first adjustment axis ($D_1$) when the second balance beam (32) is in the add ingredients position and the first platform (78) defining a proportioning pointer (96) for alignment with the increments of the adjustment proportioning scale (90) to select a desired proportion as the first platform (78) is rotated about the first adjustment axis ($D_1$) when the balance beam (32) is in the add ingredients position to select a proportion between the first component and the second component when the balance beam (32) is in the filled position comprising;
- disposing the first and first containers (26, 22) on the first and second balancing areas (36, 34) respectively,
- adding a predetermined amount of the first component to the first container (26) according to the first container proportioning scale (28),
- adding the second component to the second container (22) until the balance beam (32) pivots (72) about the pivot (72) toward the first member (38) in the filled position,
- adding a third component to the second container (22) based on a measurement of the second component in the second container (22) according to the second container proportioning scale (24),
- and characterized by rotating the first platform (78) relative to the support member (58) about the first adjustment axis ($D_1$) to align the proportioning pointer (96) of the first platform (78) with a predetermined increment on the adjustment proportioning scale (90) to adjust the distance between the first distance axis ($E_1$) of the first balancing area (36) and the tipping axis (C) to define a first variable distance ($Pd_1$) between said first distance axis ($E_1$) and the tipping axis (C).

* * * * *